United States Patent
You et al.

(10) Patent No.: US 7,345,112 B2
(45) Date of Patent: Mar. 18, 2008

(54) THERMOPLASTIC RESIN COMPOSITION AND METHOD FOR PREPARING THEREOF

(75) Inventors: Han-jong You, Daejeon (KR);
Chan-hong Lee, Daejeon (KR);
Byoung-il Kang, Daejeon (KR);
Seong-lyong Kim, Daejeon (KR)

(73) Assignee: LG Chem, Ltd. (KR)

( * ) Notice: Subject to any disclaimer, the term of this patent is extended or adjusted under 35 U.S.C. 154(b) by 306 days.

(21) Appl. No.: 11/254,848

(22) Filed: Oct. 20, 2005

(65) Prior Publication Data

US 2006/0106163 A1 May 18, 2006

(30) Foreign Application Priority Data

Oct. 20, 2004 (KR) .............. 10-2004-0084066

(51) Int. Cl.
*C08L 51/00* (2006.01)
(52) U.S. Cl. .......................... 525/66; 525/67
(58) Field of Classification Search .............. 525/66, 525/67
See application file for complete search history.

(56) References Cited

U.S. PATENT DOCUMENTS

| | | | |
|---|---|---|---|
| 4,579,909 A | 4/1986 | Giles, Jr. et al. ........... | 525/148 |
| 5,068,285 A | 11/1991 | Laughner .................... | 525/67 |
| 6,048,617 A | 4/2000 | Okitsu et al. ............... | 428/412 |
| 6,476,126 B1 | 11/2002 | Chen et al. .................. | 525/67 |
| 6,605,656 B2 | 8/2003 | Ryntz et al. ................ | 523/206 |

FOREIGN PATENT DOCUMENTS

DE 19846202 * 4/2000

OTHER PUBLICATIONS

Norbert, CAPLUS AN 200:280165, Apr. 2000.*

* cited by examiner

*Primary Examiner*—Jeffrey Mullis
(74) *Attorney, Agent, or Firm*—Cantor Colburn LLP

(57) ABSTRACT

The present invention relates to a thermoplastic resin composition and a preparation method of the same, more precisely, a thermoplastic resin composition containing acrylate-styrene-acrylonitrile (ASA) graft copolymer resin, aromatic polycarbonate resin, aromatic vinyl compound and vinyl cyan compound copolymer resin and styrene-acrylonitrile graft maleic anhydride (SAN-g-MAN) to improve exterior physical properties such as scratch resistance, surface gloss, colorability, weather resistance, etc, and a preparation method of the same.

11 Claims, No Drawings

THERMOPLASTIC RESIN COMPOSITION AND METHOD FOR PREPARING THEREOF

This application claims the benefit of the filing date of Korean Patent Application No. 10-2004-0084066, filed on Oct. 20, 2004 in the Korean Intellectual Property Office, the disclosure of which is incorporated herein in its entirety by reference.

TECHNICAL FIELD

The present invention relates to a thermoplastic resin composition and a preparation method of the same, more precisely, a thermoplastic resin composition having excellent exterior properties such as scratch resistance, surface gloss, colorability and weather resistance, etc, and a preparation method of the same.

BACKGROUND ART

Owing to their excellent weather resistance, chemical resistance and thermal stability, acrylate-styrene-acrylonitrile (ASA) thermoplastic resins have been used for exterior supplies including electric and electronic components, building materials, sporting goods, car parts, etc, and more specifically applied to satellite antennas, kayak paddles, chassis joiner and profile, door panel, car radiator grill, side mirror housing, etc.

Resins having poor weather resistance, for example acrylonitrile-butadiene-styrene (ABS) resin, are required to be processed by plating or painting to improve their weather resistance and polishing. But, the additional processes raise the price and environmental problems, which had better be avoided.

Unlike ABS resin, ASA resin has excellent weather resistance, making it very useful for external use, and is produced without surface coating, plating and painting processes. Besides, the omission of post-process results in the lowering of the production price and pro-environmental product. However, ASA resin is not resistant to scratch because plastic is exposed on the outside of surface and might have poor outward appearance because plating is omitted.

Those problems of scratch and poor exterior quality are possessed by most plastic products and numbers of methods have been proposed to overcome the problems.

U.S. Pat. No. 6,048,617 describes that the properties such as weather resistance, scratch resistance and thermal stability could be improved by surface coating with acrylic thermosetting coating agent on PC, PVC, ABS resin moldings. U.S. Pat. No. 6,605,656 B2 describes that scratch resistance could be improved by alloying olefin resin and nylon resin using compatabilizer.

U.S. Pat. No. 4,579,909 describes the method to improve the physical properties such as impact strength and bending strength by using trimix of ASA, PMMA and PC.

U.S. Pat. No. 5,068,285 describes that MBS, as an impact stiffener, was added to the blend of PC and ASA, resulted in the improvement of compatibility and elasticity. However, the addition of MBS also caused the decrease of weather resistance.

U.S. Pat. No. 6,476,126 B1 describes the use of the blend of ASA resin and PC resin, which was though limited in the dealing of exterior quality problem according to the ASA graft resin polymerization and in explanation of simple a blend resin composition not including any compatabilizer.

Therefore, more studies on a thermoplastic resin having excellent exterior properties are required.

DISCLOSURE OF THE INVENTION

To solve the problems of the conventional methods of preparing a resin, it is an object of the present invention to provide a thermoplastic resin composition having excellent exterior properties such as scratch resistance, surface gloss, colorability and weather resistance, and a preparation method of the same.

It is another object of the present invention to provide a thermoplastic resin which has excellent scratch resistance, surface gloss, colorability, weather resistance and impact strength so as to be appropriate for the exterior uses, and a preparation method thereof.

To achieve the above objects, the present invention provides a thermoplastic resin composition which characteristically contains:

a) 10~50 weight part of acrylate-styrene-acrylonitrile (ASA) graft copolymer resin;

b) 10~60 weight part of aromatic polycarbonate resin;

c) 5~40 weight part of the copolymer resin of aromatic vinyl compound and vinyl cyan compound; and d) 2~10 weight part of styrene-acrylonitrile graft maleic anhydride (SAN-g-MAH) for 100 weight part of a)+b)+c).

The present invention also provides a preparation method for the thermoplastic resin comprising the following steps:

a) adding aromatic vinyl compound and vinyl cyan compound copolymer to acrylate-styrene-acrylonitrile graft copolymer resin;

b) adding aromatic polycarbonate resin to the mixture of the above a); and c) adding styrene-acrylonitrile graft maleic anhydride (SAN-g-MAH) to the mixture of the above step b).

Hereinafter, the present invention is described in detail.

The thermoplastic resin composition of the present invention characteristically contains a) acrylate-styrene-acrylonitrile (ASA) graft copolymer resin, b) aromatic polycarbonate resin, c) aromatic vinyl compound and vinyl cyan compound copolymer resin, and d) styrene-acrylonitrile graft maleic anhydride (SAN-g-MAH).

The thermoplastic resin composition of the present invention is composed of the following components.

a) Acrylate-Styrene-Acrylonitrile (ASA) Graft Copolymer Resin

The acrylate-styrene-acrylonitrile graft copolymer resin used in the present invention is composed of 5~15 weight part of acrylate-styrene-acrylonitrile graft copolymer resin containing small diameter alkyl acrylate rubber polymer having mean diameter of 500~2,000 Å and 10~30 weight part of acrylate-styrene-acrylonitrile graft copolymer resin containing large diameter alkyl acrylate rubber polymer having mean diameter of 2,500~5,000 Å.

The acrylate-styrene-acrylonitrile graft copolymer resin containing small diameter alkyl acrylate rubber polymer and the acrylate-styrene-acrylonitrile graft copolymer resin containing large diameter alkyl acrylate rubber polymer can be prepared by polymerizing alkyl acrylate rubber polymer, aromatic vinyl compound and vinyl cyan compound.

i) Acrylate-Styrene-Acrylonitrile Graft Copolymer Resin Containing Small Diameter Alkyl Acrylate Rubber Polymer The acrylate-styrene-acrylonitrile graft copolymer resin containing small diameter alkyl acrylate rubber polymer is composed of a) 5~50 weight part of small diameter alkyl acrylate rubber polymer having mean diameter of 500~2,000 Å, b) 10~50 weight part of aromatic vinyl compound, and c) 1~20 weight part of vinyl cyan compound.

The small diameter alkyl acrylate rubber polymer having mean diameter of 500~2,000 Å of the above a) can be prepared by emulsion polymerization of alkyl acrylate monomer, precisely, emulsion polymerization with mixture of â alkyl acrylate monomer, ƀ emulsifier, ĉ initiator, đ grafting agent, ê cross-linking agent, f̂ electrolyte and ĝ ion-exchanged water.

As alkyl acrylate monomer of â, butyl acrylate, ethyl hexyl acrylate or their mixture can be used and among them butyl acrylate is preferred. The preferable content of the monomer is 5~50 weight part for 100 weight part of small diameter alkyl acrylate rubber polymer.

As emulsifier of ƀ, alkyl sulphosuccinate metallic salt derivative having 12~18 carbons and pH 3~9, alkyl ester sulfate having 12~20 carbons or sulfonic acid metallic salt derivative is available.

Particularly, alkyl sulphosuccinate metallic salt derivative having 12~18 carbons and pH 3~9 can be selected from a group consisting of dicyclohexyl sulphosuccinate, dihexyl sulphosuccinate, di 2-ethyl hexyl sulphosuccinate sodium salt, di 2-ethyl hexyl sulphosuccinate potassium salt and di 2-ethyl hexyl sulphosuccinate lithium salt, and alkyl ester sulfate having 12~20 carbons or sulfonic acid metallic salt derivative can be selected from a group consisting of sodium lauric sulfate, sodium dodecyl sulfate, sodium dodecyl benzene sulfate, sodium octa decyl sulfate, sodium oleic sulfate, potassium dodecyl sulfate, and potassium octa decyl sulfate. In particular, di 2-ethyl hexyl sulphosuccinate sodium salt is preferred as an emulsifier of the invention.

The preferable content of emulsifier for the invention is 1~4 weight part for 100 weight part of small diameter alkyl acrylate rubber polymer, and the content of 1.5~3 weight part is more preferred.

As initiator of the above ĉ, inorganic or organic peroxide can be used, which is exemplified by water-soluble initiators such as potassium persulfate, sodium persulfate or ammonium persulfate; or oil-soluble initiators such as cumene hydro peroxide or benzoil peroxide, etc.

The preferable content of the initiator is 0.05~0.2 weight part for 100 weight part of small diameter alkyl acrylate rubber polymer.

As grafting agent of đ, aryl methacrylate (AMA), triaryl isocyanurate (TAIC), triaryl amine (TAA), or diaryl amine (DAA) can be used, and the preferable content of the grafting agent is 0.01~0.07 weight part for 100 weight part of small diameter alkyl acrylate rubber polymer.

The cross-linking agent of ê can be selected from a group consisting of ethylene glycol dimethacrylate, diethylene glycol dimethacrylate, triethylene glycol dimethacrylate, 1,3-butandiol dimethacrylate, 1,6-hexandiol dimethacrylate, neopentyl glycol dimethacrylate, trimethylol propane trimethacrylate, and trimethylol methane triacrylate. The preferable content of the cross-linking agent is 0.02~0.3 weight part for 100 weight part of small diameter alkyl acrylate rubber polymer.

As electrolyte of f̂, $NaHCO_3$, $Na_2S_2O_7$ or $K_2CO_3$ can be used, and among them, $NaHCO_3$ is more preferred. The preferable content of the electrolyte is 0.05~0.4 weight part for 100 weight part of small diameter alkyl acrylate rubber polymer.

The content of ion-exchanged water of ĝ is properly regulated according to the contents of other components.

The above components can be added serially or by a mixing way of serial and all at once for emulsion polymerization.

The small diameter alkyl acrylate rubber polymer prepared by the emulsion polymerization has pH 5~9, and more preferably has pH 6~8.

Mean diameter of the small diameter alkyl acrylate rubber polymer measured by Dynamic Laser Light Scattering method using Nicomp 370 HPL was 500~2,000 Å and more preferably 700~1,500 Å.

The preferable content of the small diameter alkyl acrylate rubber polymer prepared in the above a) is 5~50 weight part for 100 weight part of acrylate-styrene-acrylonitrile graft copolymer resin containing small diameter alkyl acrylate rubber polymer. When the content is less than 5 weight part, impact strength is decreased. On the contrary, when the content is more than 50 weight part, grafting rate is lowered, resulting in poor gloss, hardness and scratch resistance.

The aromatic vinyl compound of b) is a kind of styrene monomer derivatives such as styrene, alpha methylstyrene, or para methylstyrene.

The preferable content of the aromatic vinyl compound is 10~50 weight part for 100 weight part of acrylate-styrene-acrylonitrile graft copolymer resin containing small diameter alkyl acrylate rubber polymer.

Acrylonitrile is preferred as a vinyl cyan compound of c), and the preferable content of it is 1~20 weight part for 100 weight part of acrylate-styrene-acrylonitrile graft copolymer resin containing small diameter alkyl acrylate rubber polymer.

For the preparation of acrylate-styrene-acrylonitrile graft copolymer resin containing small diameter alkyl acrylate rubber polymer, generally used d) emulsifier, e) polymerization initiator, f) molecular weight regulator or g) ion-exchanged water, in addition to a) small diameter alkyl acrylate rubber polymer, b) aromatic vinyl compound and c) vinyl cyan compound, can be additionally included according to the purpose of a use.

As emulsifier of d), carboxylic acid metal salt derivative having pH 9~13 and 12~20 carbons such as fatty acid metal salt and rosin acid metal salt can be used. More precisely, fatty acid metal salt having 12~20 carbons is exemplified by fatty acid, lauric acid, sodium oleate or potassium oleate, and rosin acid metal salt having 12~20 carbons is exemplified by sodium rosin acid or potassium rosin acid.

The preferable content of the emulsifier for the present invention is 1~2 weight part for 100 weight part of acrylate-styrene-acrylonitrile graft copolymer resin containing small diameter alkyl acrylate rubber polymer.

The same component as the initiator which is used for the preparation of small diameter alkyl acrylate rubber polymer can be used as the polymerization initiator of e), and the preferable content of the polymerization initiator is 0.05~0.3 weight part for 100 weight part of acrylate-styrene-acryloni trile graft copolymer resin containing small diameter alkyl acrylate rubber polymer.

As molecular weight regulator of f), third degree dodecyl mercaptan is preferred and the preferable content of it is 0.02~0.2 weight part for 100 weight part of acrylate-styrene-acrylonitrile graft copolymer resin containing small diameter alkyl acrylate rubber polymer. The content of less than 0.02 weight part results in poor gloss. The content of over 0.2 weight part results in the severe decrease of impact strength.

There are two ways of treating the mixed monomers including emulsifier to prepare acrylate-styrene-acrylonitrile graft copolymer resin containing small diameter alkyl acrylate rubber polymer; a serial addition and a package addition. In the case of a package addition, that is the entire monomer mixture is added at once, pH of the polymerization system temporarily rises, making grafting difficult and lowering the stability of a particle which means the inside structure of a particle is not regular. Thus, a serial addition of the monomers including emulsifier is preferred.

The acrylate-styrene-acrylonitrile graft copolymer resin containing small diameter alkyl acrylate rubber polymer prepared in the above a) i) has pH 8~11, and more preferably pH 9~10.5.

ii) Acrylate-Styrene-Acrylonitrile Graft Copolymer Resin Containing Large Diameter Alkyl Acrylate Rubber Polymer Acrylate-styrene-acrylonitrile graft copolymer resin containing large diameter alkyl acrylate rubber polymer is composed of a) 10~60 weight part of large diameter alkyl acrylate rubber polymer having mean diameter of 2,500~5,000 Å, b) 10~50 weight part of aromatic vinyl compound, and c) 1~20 weight part of vinyl cyan compound.

The large diameter alkyl acrylate rubber polymer of the above a) which has mean diameter of 2,500~5,000 Å can be prepared by emulsion polymerization, and more precisely, emulsion polymerization with â alkyl acrylate monomer, ƀ emulsifier, ĉ initiator, đ grafting agent, ê cross-linking agent, f̂ electrolyte and ĝ ion-exchanged water.

The same component as the alkyl acrylate monomer used for the preparation of small diameter alkyl acrylate rubber polymer can be used as alkyl acrylate monomer of â and the preferable content of it is 10~60 weight part for 100 weight part of large diameter alkyl acrylate rubber polymer.

The same component as the emulsifier used for the preparation of small diameter alkyl acrylate rubber polymer can also be used as emulsifier of ƀ, and the preferable content of it is 0.1~1 weight part for 100 weight part of large diameter alkyl acrylate rubber polymer.

The components and the contents of initiator of ĉ, grafting agent of đ, cross-linking agent of ê and electrolyte of f̂ can also be the same as those which are used for the preparation of small diameter alkyl acrylate rubber polymer.

Those components can be added serially or by a mixing way of serial addition and a package addition for emulsion polymerization.

pH of the large diameter alkyl acrylate rubber polymer prepared by the above explained emulsion polymerization is 5~9 and pH 6~8 is more preferred.

The mean diameter of the large diameter alkyl acrylate rubber polymer is 2,500~5,000 Å and more preferably 3,000~4,500 Å.

The preferable content of the large diameter alkyl acrylate rubber polymer of a) prepared as the above is 10~50 weight part for 100 weight part of acrylate-styrene-acrylonitrile graft copolymer resin containing large diameter alkyl acrylate rubber polymer. The content of less than 10 weight part results in the decrease of impact strength and the content of more than 50 weight part results in lower grafting rate and poor gloss, hardness and scratch resistance.

The components and the contents of aromatic vinyl compound of b), vinyl cyan compound of c), generally used emulsifier of d), polymerization initiator of e) or molecular weight regulator of f) can be the same as those used for the preparation of small alkyl acrylate rubber polymer.

In case of a package addition of mixed monomers, that is the mixture of all monomers is added at a time together with emulsifier for the preparation of acrylate-styrene-acrylonitrile graft copolymer resin containing large diameter alkyl acrylate rubber polymer, pH of the polymerization system is increased temporarily, making grafting difficult and lowering the stability of a particle which means the inside structure of a particle is not regular. Therefore, a serial addition of mixed monomers including initiator is preferred for the grafting reaction.

Acrylate-styrene-acrylonitrile graft copolymer resin containing large diameter alkyl acrylate rubber polymer prepared in the above a) ii) has pH 8~11 and more preferably pH 9~10.5.

Atmospheric aggregation of acrylate-styrene-acrylonitrile graft copolymer resin containing small or large diameter alkyl acrylate copolymer resin is performed at 85° C. using calcium chloride solution before or after the addition of monomer mixture, followed by aging at 95° C. After dehydration and washing, the product is dried for 30 minutes with 90° C. hot air, resulting in acrylate-styrene-acrylonitrile graft copolymer resin powder.

At this time, the mixing ratio of acrylate-styrene-acrylonitrile graft copolymer resin containing small diameter alkyl acrylate copolymer to acrylate-styrene-acrylonitrile graft copolymer resin containing large diameter alkyl acrylate copolymer resin is 1:1-1:4. When the mixing ratio is out of the above range, impact strength, colorability and surface gloss of the final product are remarkably decreased.

The preferable content of acrylate-styrene-acrylonitrile graft copolymer resin of a) containing acrylate-styrene-acrylonitrile graft copolymer resin containing small diameter alkyl acrylate copolymer and large diameter alkyl acrylate copolymer is 10~50 weight part for 100 weight part of the mixture of acrylate-styrene-acrylonitrile graft copolymer resin of a)+aromatic polycarbonate resin of b)+aromatic vinyl compound and vinyl cyan compound copolymer resin of c). The content of less than 10 weight part reduces impact strength remarkably and the content of more than 50 weight part results in the decrease of fluidity, hardness and scratch resistance.

b) Aromatic Polycarbonate Resin

For aromatic polycarbonate resin of the invention, either any conventional aromatic polycarbonate resin or a commercial polycarbonate CALIBRE 302-5 grade (hyperviscosity resin having improved UV stabilizer, 1.20 kg/m$^3$ of specific gravity, and 5.0 of fluidity (300° C., 1.2 kg load), LG-DOW POLYCARBONATE) can be used.

The aromatic polycarbonate resin is preferably prepared by adding the mixture of a) acrylate-styrene-acrylonitrile graft copolymer resin+b) aromatic polycarbonate resin+c) aromatic vinyl compound and vinyl cyan compound copolymer resin by 10~60 weight part to 100 weight part of the copolymer resin.

c) Aromatic Vinyl Compound and Vinyl Cyan Compound Copolymer Resin

The aromatic vinyl compound and vinyl cyan compound copolymer resin can be one of styrene-acrylonitrile (SAN) copolymers.

The aromatic vinyl compound and vinyl cyan compound copolymer resin preferably includes the mixture of a) acrylate-styrene-acrylonitrile graft copolymer resin+b) aromatic polycarbonate resin+c) aromatic vinyl compound and vinyl cyan compound by 5~40 weight part for 100 weight part of the copolymer resin.

d) Styrene-Acrylonitrile Graft Maleic Anhydride (SAN-g-MAH)

Styrene-acrylonitrile graft maleic anhydride used in the present invention has a function of increasing blend compatibility of acrylate-styrene-acrylonitrile graft copolymer resin, aromatic polycarbonate resin and aromatic vinyl compound and vinyl cyan compound copolymer resin.

The styrene-acrylonitrile graft maleic anhydride can be prepared by adding a small amount of lubricant and antioxidant to maleic anhydride (MAH) and styrene-acrylonitrile copolymer and molding with twin screw extruder.

The preferable content of the maleic anhydride is 0.5~15 weight part for 100 weight part of styrene-acrylonitrile graft maleic anhydride, and 2~8 weight part is more preferable and 3~6 weight part is most preferable.

The content of the styrene-acrylonitrile graft maleic anhydride is not limited but it is preferred that 2~10 weight part is added to 100 weight part of the mixture of a) acrylate-styrene-acrylonitrile graft copolymer resin+b) aromatic polycarbonate resin+c) aromatic vinyl compound and vinyl cyan compound copolymer resin. The content of less than 2 weight part results in the doubt of the effect of its commercial use, causing the decrease of properties such as thermal resistance, surface gloss, impact strength, etc. The content of more than 10 weight part causes the generation of gas, which results in the poor weather resistance of the final product.

The thermoplastic resin of the present invention composed of the above mentioned components can additionally include conventional lubricant, antioxidant or UV stabilizer according to the purpose of a use.

The lubricant can be selected from a group consisting of ethylene bis-stearamide, oxidized polyethylene wax, magnesium stearate, and a mixture of them. The preferable content of lubricant is 0.1~5 weight part for 100 weight part of the thermoplastic resin composition, and the content of 0.5~2 weight part is more preferable.

It is also preferred for antioxidant to be included by 0.5~2 weight part for 100 weight part of the thermoplastic resin composition, and UV stabilizer to be included by 0.05~3 weight part for 100 weight part of the thermoplastic resin composition and is more preferred to be included by 0.2~1 weight part.

The present invention also provides a preparation method for the thermoplastic resin composed of the above components comprising the following steps: a) adding aromatic vinyl compound and vinyl cyan compound copolymer to acrylate-styrene-acrylonitrile graft copolymer resin; b) adding aromatic polycarbonate resin to the mixture of the above a); and c) adding styrene-acrylonitrile graft maleic anhydride (SAN-g-MAH) to the mixture of the above b).

The thermoplastic resin composition of the present invention prepared by the above method has excellent exterior properties such as scratch resistance, surface gloss, colorability, weather resistance, impact strength, color, etc, so that it is proper for exterior uses.

BEST MODE FOR CARRYING OUT THE INVENTION

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

EXAMPLE 1

Preparation of Acrylate-Styrene-Acrylonitrile Graft Copolymer Resin i) Preparation of Acrylate-Styrene-Acrylonitrile Graft Copolymer Resin Containing Small Diameter Alkyl Acrylate Rubber Polymer To 10 L reactor was added a package of 70 weight part of distilled water, 10 weight part of butylacrylate, 1.5 weight part of di 2-ethylhexyl sulfosuccinate sodium salt, 0.02 weight part of ethylene glycol dimethacrylate, 0.1 weight part of sodium bicarbonate ($NaHCO_3$) and 0.4 weight part of potassium persulfate. The temperature of the reaction solution was raised to 70° C., followed by reaction for one hour to prepare seed. To the produced seed were added a mixture of 34 weight part of distilled water, 0.5 weight part of di 2-ethylhexyl sulfosuccinate sodium salt, 30 weight part of butyl acrylate and 0.1 weight part of sodium bicarbonate and 0.06 weight part of initiator, potassium persulfate, serially for 3 hours at 70° C., leading to the polymerization. As a result, small diameter alkyl acrylate rubber polymer having mean diameter of 800~1,000 Å was prepared.

To the prepared small diameter alkyl acrylate rubber polymer having mean diameter of 800~1,000 Å were added a mixture of 63 weight part of distilled water, 1.4 weight part of potassium rosin acid, 0.042 weight part of potassium hydroxide (KOH), 40 weight part of styrene (ST), 20 weight part of acrylonitrile (AN) and 0.05 weight part of third degree dodecyl mercaptan (TDDM) and 0.1 weight part of polymerization initiator, potassium persulfate, serially for 5 hours at 70° C., leading to the polymerization. To increase the polymerization conversion rate, further reaction was induced for 1 more hour at 80° C., then the solution was cooled down to 60° C., resulting in acrylate-styrene-acrylonitrile graft copolymer resin containing small alkyl acrylate rubber polymer. The mean diameter of the product was 1,200 Å, polymerization conversion rate was 98%, pH was 9.5 and grafting rate was 40%.

Atmospheric aggregation of acrylate-styrene-acrylonitrile graft copolymer resin containing small diameter alkyl acrylate rubber polymer prepared above was performed at 85° C. with calcium chloride solution. After aging at 95° C., dehydration and washing were performed. The product was then dried with 90° C. hot air for 30 minutes to give the final acrylate-styrene-acrylonitrile graft copolymer resin powder containing small diameter alkyl acrylate rubber polymer.

ii) Preparation of Acrylate-Styrene-Acrylonitrile Graft Copolymer Resin Containing Large Diameter Alkyl Acrylate Rubber Polymer To 10 L reactor was added a package of 70 weight part of distilled water, 5 weight part of butylacrylate, 0.015 weight part of di 2-ethylhexyl sulfosuccinate sodium salt, 0.02 weight part of ethylene glycol dimethacrylate, 0.1 weight part of sodium bicarbonate ($NaHCO_3$) and 0.04 weight part of potassium persulfate. The temperature of the reaction solution was raised to 70° C., followed by reaction for one hour to prepare seed. To the produced seed were added a mixture of 34 weight part of distilled water, 0.285 weight part of di 2-ethylhexyl sulfosuccinate sodium salt, 45 weight part of butyl acrylate and 0.1 weight part of sodium bicarbonate and 0.06 weight part of initiator, potassium persulfate, serially for 3 hours at 70° C., leading to the polymerization. As a result, large diameter alkyl acrylate rubber polymer having mean diameter of 3,000~4,000 Å was prepared.

To the prepared large diameter alkyl acrylate rubber polymer having mean diameter of 3,000~4,000 Å were added a mixture of 63 weight part of distilled water, 1.4 weight part of potassium rosin acid, 0.042 weight part of potassium hydroxide, 35 weight part of styrene, 15 weight part of acrylonitrile and 0.05 weight part of third degree dodecyl mercaptan and 0.1 weight part of polymerization initiator, potassium persulfate, serially for 5 hours at 70°, leading to the polymerization. To increase the polymerization conversion rate, further reaction was induced for 1 more hour at 80° C., then the solution was cooled down to 60° C., resulting in acrylate-styrene-acrylonitrile graft copolymer resin containing large alkyl acrylate rubber polymer. The mean diameter of the product was 4,500 Å, polymerization conversion rate was 99%, pH was 9.5 and grafting rate was 45%.

Atmospheric aggregation of acrylate-styrene-acrylonitrile graft copolymer resin containing large diameter alkyl acrylate rubber polymer prepared above was performed at 85° C. with calcium chloride solution. After aging at 95° C., dehydration and washing were performed. The product was then dried with 90° C. hot air for 30 minutes to give the final acrylate-styrene-acrylonitrile graft copolymer resin powder containing large diameter alkyl acrylate rubber polymer.

(Preparation of Styrene-Acrylonitrile Graft Maleic Anhydride)

5 weight part of maleic anhydride (MAH, Aldrich), 95 weight part of styrene-acrylonitrile resin (grade 80 HF, AN content 24%, LG Chem, Ltd.), 1 weight part of lubricant and 0.4 weight part of antioxidant were reacted in a twin screw extruder, followed by extrusion to give styrene-acrylonitrile graft maleic anhydride.

(Preparation of Thermoplastic Resin)

5 weight part of acrylate-styrene-acrylonitrile graft copolymer resin containing small diameter alkyl acrylate rubber polymer, 20 weight part of acrylate-styrene-acrylonitrile graft copolymer resin containing large diameter alkyl acrylate rubber polymer, 30 weight part of polycarbonate CALIBRE 302-5 grade (LG-DOW POLYCARBONATE) which is an aromatic polycarbonate resin produced without being passed through a purifying process, 35 weight part of styrene-acrylonitrile (SAN) copolymer as an aromatic vinyl compound and vinyl cyan compound copolymer resin and 10 weight part of styrene-acrylonitrile graft maleic anhydride prepared above were all mixed together, to which 1 weight part of lubricant, 0.8 weight part of antioxidant and 0.8 weight part of UV stabilizer were added. Finally, pellet was produced using a twin screw extruder at 260° C.

EXAMPLE 2

The pellet was produced by the same manner as described in Example 1 except that 35 weight part of aromatic polycarbonate and 30 weight part of styrene-acrylonitrile copolymer were used.

EXAMPLE 3

The pellet was produced by the same manner as described in Example 1 except that 40 weight part of aromatic polycarbonate and 25 weight part of styrene-acrylonitrile copolymer were used.

EXAMPLE 4

The pellet was produced by the same manner as described in Example 1 except that 8 weight part of acrylate-styrene-acrylonitrile graft copolymer resin containing small diameter alkyl acrylate rubber polymer, 25 weight part of acrylate-styrene-acrylonitrile graft copolymer resin containing large diameter alkyl acrylate rubber polymer, 32 weight part of styrene-acrylonitrile copolymer and 5 weight part of SAN-g-MAH were used.

EXAMPLE 5

The pellet was produced by the same manner as described in Example 1 except that 10 weight part of acrylate-styrene-acrylonitrile graft copolymer resin containing small diameter alkyl acrylate rubber polymer, 30 weight part of acrylate-styrene-acrylonitrile graft copolymer resin containing large diameter alkyl acrylate rubber polymer, 25 weight part of styrene-acrylonitrile copolymer and 5 weight part of SAN-g-MAH were used.

EXAMPLE 6

The pellet was produced by the same manner as described in Example 1 except that 5 weight part of acrylate-styrene-acrylonitrile graft copolymer resin containing small diameter alkyl acrylate rubber polymer, 25 weight part of acrylate-styrene-acrylonitrile graft copolymer resin containing large diameter alkyl acrylate rubber polymer, 10 weight part of polycarbonate CALIBRE 302-5 grade, 57 weight part of styrene-acrylonitrile copolymer and 3 weight part of SAN-g-MAH were used.

COMPARATIVE EXAMPLE 1

The pellet was produced by the same manner as described in Example 1, except that polycarbonate CALIBRE 302-5 grade was not used and 75 weight part of styrene-acrylonitrile copolymer was used.

COMPARATIVE EXAMPLE 2

The pellet was produced by the same manner as described in Comparative Example 1, except that 10 weight part of acrylate-styrene-acrylonitrile graft copolymer resin containing small diameter alkyl acrylate rubber polymer, 28 weight part of acrylate-styrene-acrylonitrile graft copolymer resin containing large diameter alkyl acrylate rubber polymer and 62 weight part of styrene-acrylonitrile copolymer were used.

COMPARATIVE EXAMPLE 3

The pellet was produced by the same manner as described in Example 1, except that 22 weight part of acrylate-styrene-acrylonitrile graft copolymer resin containing large diameter alkyl acrylate rubber polymer, 35 weight part of polycarbonate CALIBRE 302-5 grade, 37 weight part of styrene-acrylonitrile (SAN) copolymer and 1 weight part of SAN-g-MAH were used.

COMPARATIVE EXAMPLE 4

The pellet was produced by the same manner as described in Comparative Example 3 except that 20 weight part of acrylate-styrene-acrylonitrile graft copolymer resin containing large diameter alkyl acrylate rubber polymer, 35 weight part of polycarbonate CALIBRE 302-5 grade and 40 weight part of styrene-acrylonitrile copolymer were used but SAN-g-MAN was excluded.

COMPARATIVE EXAMPLE 5

The pellet was produced by the same manner as described in Example 4 except that 45 weight part of styrene-acrylonitrile copolymer was used but neither acrylate-styrene-acrylonitrile graft copolymer resin containing small diameter alkyl acrylate rubber polymer nor SAN-g-MAH were used.

COMPARATIVE EXAMPLE 6

The pellet was produced by the same manner as described in comparative Example 5, except that 20 weight part of acrylate-styrene-acrylonitrile graft copolymer resin containing large diameter alkyl acrylate rubber polymer, 50 weight part of polycarbonate CALIBRE 302-5 grade and 30 weight part of styrene-acrylonitrile copolymer were used.

After the injection of the pellets prepared in Examples 1~6 and in Comparative Examples 1~6, the physical properties of the products such as impact strength, heat deflection temperature, fluidity, tensile strength, scratch resistance, gloss, color and weather resistance, etc were measured and the results are shown in Table 1.

a) Impact strength (¼", 23° C., kg.cm/cm)—measured by ASTM D256.

b) Heat deflection temperature (¼", 18.5 kg/cm$^2$)—measured by ASTM D648.

c) Fluidity (220° C., 10 kg load, g/10 min)—measured by ASTM D1238.

d) Tensile strength (kg/cm$^2$)—measured by ASTM D638.

e) Scratch resistance—measured by pencil hardness test.

f) Gloss (45°)—measured by ASTM D523.

g) Color (L*, b*)—measured by colormeter using Comparative Example 1 as a standard.

h) Weather resistance (ΔE)—measured by QUV.

In the meantime, scratch resistance was improved with the increase of aromatic polycarbonate resin content, as shown in Examples 1~3 and in Comparative Example 6, but over dose of the aromatic polycarbonate resin, more than 40 weight part, rather decreased fluidity, as shown in Comparative Example 6.

The thermoplastic resin of Comparative Example 5 which did not contain acrylate-styrene-acrylonitrile graft copolymer resin containing small diameter alkyl acrylate rubber polymer showed that its color (L*, b*) was changed to plus direction, compared with that of Example 4 of the invention. From the results, it was confirmed that acrylate-styrene-acrylonitrile graft copolymer resin containing small diameter alkyl acrylate rubber polymer greatly contributed to the improvement of color of a thermoplastic resin.

INDUSTRIAL APPLICABILITY

The thermoplastic resin composition of the present invention has excellent exterior physical properties such as scratch resistance, surface gloss, colorability, weather resistance, impact strength and color, etc, so it is very proper for outdoor uses.

Those skilled in the art will appreciate that the conceptions and specific embodiments disclosed in the foregoing description may be readily utilized as a basis for modifying

TABLE 1

| | Compartment | Example | | | | | | Comparative Example | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Composition | ASA-Small diameter | 5 | 5 | 5 | 8 | 10 | 5 | 5 | 10 | 5 | 5 | — | — |
| | ASA-Large diameter | 20 | 20 | 20 | 25 | 30 | 25 | 20 | 28 | 22 | 20 | 25 | 20 |
| | PC(205-5) | 30 | 35 | 40 | 30 | 30 | 10 | — | — | 35 | 35 | 30 | 50 |
| | SAN Resin | 35 | 30 | 25 | 32 | 25 | 57 | 75 | 62 | 37 | 40 | 45 | 30 |
| | ASA-g-MAH | 10 | 10 | 10 | 5 | 5 | 3 | — | — | 1 | — | — | — |
| Physical Property | Impact Strength | 15.4 | 7.5 | 24.7 | 18.1 | 21.5 | 13.9 | 5.7 | 11.8 | 12.6 | 11.1 | 9.8 | 53.2 |
| | Heat Deflection Temp. | 94.3 | 95.2 | 96.5 | 97.9 | 93.8 | 92.7 | 88.5 | 86.7 | 94.1 | 93.8 | 93.2 | 97.5 |
| | Fluidity | 11.2 | 10.3 | 9.7 | 10.8 | 10.2 | 14.5 | 22.1 | 19.5 | 10.2 | 10.5 | 10.1 | 4.3 |
| | Tensile Strength | 532 | 557 | 576 | 528 | 525 | 520 | 565 | 537 | 548 | 550 | 522 | 575 |
| | Pencil Hardness | 2B | B | B | 2B | 2B | 2B | 3B | 4B | B | B | 2B | B |
| | Gloss | 98.3 | 98.8 | 100.1 | 97.9 | 97.4 | 96.5 | 95.1 | 94.7 | 95.5 | 95.1 | 94.3 | 97.8 |
| | Color  L* | −0.85 | −0.71 | −0.58 | −0.84 | −0.95 | −0.24 | Standard | −0.05 | −0.65 | −0.67 | −0.35 | −0.57 |
| |         B* | −1.18 | −1.31 | −1.38 | −1.21 | −1.31 | −0.71 | Standard | 0.08 | −1.12 | −0.99 | −0.85 | −1.54 |
| | Weather Resistance | 0.82 | 0.78 | 0.76 | 0.85 | 0.75 | 0.84 | 1.35 | 1.51 | 0.85 | 0.78 | 0.82 | 0.79 |

As shown in Table 1, the products of Examples 1~4 containing aromatic polycarbonate resin and styrene-acrylonitrile graft maleic anhydride, according to the present invention, were confirmed to have excellent scratch resistance (pencil hardness), impact strength, gloss, heat deflection temperature and color, compared with the conventional thermoplastic resins of Comparative Examples 1~2.

Although aromatic polycarbonate resin was included, the conventional thermoplastic resins of Comparative Examples 3~4 were confirmed to have low impact strength, gloss and heat deflection temperature, without or with a minute amount of styrene-acrylonitrile graft maleic anhydride, resulting in poor capability of commercial use.

or designing other embodiments for carrying out the same purposes of the present invention. Those skilled in the art will also appreciate that such equivalent embodiments do not depart from the spirit and scope of the invention as set forth in the appended claims.

The invention claimed is:

1. A thermoplastic resin composition which characteristically contains:
   a) 10-50 weight part of acrylate-styrene-acrylonitrile (ASA) graft copolymer resin;
   b) 10-60 weight part of aromatic polycarbonate resin;
   c) 5-40 weight part of copolymer resin of aromatic vinyl compound and vinyl cyan compound copolymer resin; and d) 2-10 weight part of styrene-acrylonitrile graft maleic anhydride (SAN-g-MAH) for 100 weight part of a)+b)+c).

2. The thermoplastic resin composition as set forth in claim 1, wherein the acrylate-styrene-acrylonitrile (ASA) graft copolymer resin of a) characteristically contains:
   i) 5-15 weight part of acrylate-styrene-acrylonitrile graft copolymer resin comprising a) 5-50 weight part of small diameter alkyl acrylate rubber polymer having mean diameter of 500-2,000 Å; b) 10-50 weight part of aromatic vinyl compound; and c) 1-20 weight part of vinyl cyan compound; and
   ii) 10-50 weight part of acrylate-styrene-acrylonitrile graft copolymer resin comprising a) 10-60 weight part of large diameter alkyl acrylate rubber polymer having mean diameter of 2,500-5,000 Å; b) 10-50 weight part of aromatic vinyl compound; and c) 1-20 weight part of vinyl cyan compound.

3. The thermoplastic resin composition as set forth in claim 2, wherein the small diameter alkyl acrylate rubber polymer of i) and the large diameter alkyl acrylate rubber polymer of ii) are prepared characteristically from alkyl acrylate monomer selected from a group consisting of butyl acrylate, ethyl hexyl acrylate, and a mixture thereof.

4. The thermoplastic resin composition as set forth in claim 1, wherein the aromatic vinyl compound is one or more styrene monomer derivatives selected from a group consisting of styrene, alpha methylstyrene and para methylstyrene.

5. The thermoplastic resin composition as set forth in claim 1, wherein the vinyl cyan compound is acrylonitrile.

6. The thermoplastic resin composition as set forth in claim 1, wherein the styrene-acrylonitrile graft maleic anhydride (SAN-g-MAH) is characteristically prepared from maleic anhydride (MAH) and styrene-acrylonitrile copolymer by using a twin screw extruder.

7. The thermoplastic resin composition as set forth in claim 6, wherein the maleic anhydride is included by 0.5-15 weight part in 100 weight part of styrene-acrylonitrile graft maleic anhydride.

8. The thermoplastic resin composition as set forth in claim 1, which can additionally include one or more additives selected from a group consisting of lubricant, antioxidant and UV stabilizer.

9. A preparation method for the thermoplastic resin comprising the following steps:
   a) adding aromatic vinyl compound and vinyl cyan compound copolymer to acrylate-styrene-acrylonitrile graft copolymer resin;
   b) adding aromatic polycarbonate resin to the mixture of the above a); and
   c) adding styrene-acrylonitrile graft maleic anhydride (SAN-g-MAH) to the mixture of the above step b).

10. The thermoplastic resin composition as set forth in claim 2, wherein the aromatic vinyl compound is one or more styrene monomer derivatives selected from a group consisting of styrene, alpha methylstyrene and para methylstyrene.

11. The thermoplastic resin composition as set forth in claim 2, wherein the vinyl cyan compound is acrylonitrile.

* * * * *